United States Patent
Howson et al.

(10) Patent No.: US 10,395,336 B2
(45) Date of Patent: Aug. 27, 2019

(54) COMPUTING SYSTEMS AND METHODS FOR PROCESSING GRAPHICS DATA USING COST INDICATIONS FOR SETS OF TILES OF A RENDERING SPACE

(71) Applicant: Imagination Technologies Limited, Kings Langley (GB)

(72) Inventors: John W. Howson, Kings Langley (GB); Richard Broadhurst, Kings Langley (GB); Steven Fishwick, Kings Langley (GB)

(73) Assignee: Imagination Technologies Limited, Kings Langley (GB)

( * ) Notice: Subject to any disclaimer, the term of this patent is extended or adjusted under 35 U.S.C. 154(b) by 0 days.

(21) Appl. No.: 15/868,368

(22) Filed: Jan. 11, 2018

(65) Prior Publication Data

US 2018/0197270 A1 Jul. 12, 2018

(30) Foreign Application Priority Data

Jan. 12, 2017 (GB) .................................. 1700564.6

(51) Int. Cl.
*G06T 1/20* (2006.01)
*G06T 1/60* (2006.01)
(Continued)

(52) U.S. Cl.
CPC .............. *G06T 1/20* (2013.01); *G06F 9/38* (2013.01); *G06T 1/60* (2013.01); *G06T 7/11* (2017.01);
(Continued)

(58) Field of Classification Search
None
See application file for complete search history.

(56) References Cited

U.S. PATENT DOCUMENTS 9,842,428 B2 * 12/2017 Wang ...................... G06T 15/80
2004/0161146 A1 * 8/2004 Van Hook .............. H04N 1/644
382/166
(Continued)

FOREIGN PATENT DOCUMENTS

GB 2481099 A 12/2011
JP 2005301457 A 10/2005
(Continued)

OTHER PUBLICATIONS

Liu et al.; "Enhancing Video Encoding for Cloud Gaming Using Rendering Information"; IEEE Transactions on Circuits and Systems for Video Technology, Institute of Electrical and Electronics Engineers; vol. 25; No. 12; Dec. 1, 2015; pp. 1960-1974.
(Continued)

*Primary Examiner* — Nurun N Flora
(74) *Attorney, Agent, or Firm* — Vorys, Sater, Seymour and Pease LLP; Vincent M DeLuca

(57) ABSTRACT

A computing system comprises graphics rendering logic and image processing logic. The graphics rendering logic processes graphics data to render an image using a rendering space which is sub-divided into a plurality of tiles. Cost indication logic obtains a cost indication for each of a plurality of sets of one or more tiles of the rendering space, wherein the cost indication for a set of one or more tiles is suggestive of a cost of processing rendered image values for a region of the rendered image corresponding to the set of one or more tiles. The image processing logic processes rendered image values for regions of the rendered image. The computing system causes the image processing logic to process rendered image values for regions of the rendered image in dependence on the cost indications for the corresponding sets of one or more tiles.

20 Claims, 4 Drawing Sheets

(51) Int. Cl.
| | |
|---|---|
| *G06T 7/11* | (2017.01) |
| *G06F 9/38* | (2018.01) |
| *G06T 11/40* | (2006.01) |
| *G06T 15/00* | (2011.01) |
| *H04N 19/00* | (2014.01) |
| *H04N 19/11* | (2014.01) |
| *H04N 19/12* | (2014.01) |
| *H04N 19/14* | (2014.01) |
| *H04N 19/17* | (2014.01) |
| *H04N 19/115* | (2014.01) |
| *H04N 19/117* | (2014.01) |
| *H04N 19/124* | (2014.01) |
| *H04N 19/174* | (2014.01) |

(52) U.S. Cl.
CPC ............ *G06T 11/40* (2013.01); *G06T 15/005* (2013.01); *H04N 19/00* (2013.01); *H04N 19/115* (2014.11); *H04N 19/117* (2014.11); *H04N 19/124* (2014.11); *H04N 19/14* (2014.11); *H04N 19/174* (2014.11)

(56) References Cited

U.S. PATENT DOCUMENTS

| | | | | |
|---|---|---|---|---|
| 2006/0188163 | A1* | 8/2006 | Elder | H04N 1/644 382/232 |
| 2013/0141445 | A1* | 6/2013 | Engh-halstvedt | G06T 5/002 345/506 |
| 2014/0139534 | A1* | 5/2014 | Tapply | G06T 15/005 345/522 |
| 2014/0198119 | A1* | 7/2014 | Seetharamaiah | G06T 15/005 345/581 |
| 2015/0092856 | A1 | 4/2015 | Mammou et al. | |
| 2018/0174349 | A1* | 6/2018 | Yang | G06T 15/005 |
| 2018/0189925 | A1* | 7/2018 | Lee | G06T 11/40 |

FOREIGN PATENT DOCUMENTS

| | | |
|---|---|---|
| WO | 2013/130030 A1 | 9/2013 |
| WO | 2016/000129 A1 | 1/2016 |

OTHER PUBLICATIONS

Tizon et al; "ROI Based Video Streaming for 3D Remote Rendering"; IEEE 13th International Workshop on, IEEE; Oct. 17, 2011; pp. 1-6.

Semsarzadeh et al; Video Encoding Acceleration in Cloud Gaming; IEEE Transactions on Circuits and Systems for Video Technology, Institute of Electrical and Electronics Engineers; vol. 25; No. 12; Dec. 1, 2015; pp. 1975-1987.

\* cited by examiner

COMPUTING SYSTEMS AND METHODS FOR PROCESSING GRAPHICS DATA USING COST INDICATIONS FOR SETS OF TILES OF A RENDERING SPACE

BACKGROUND

Some computing systems (e.g. graphics processing systems) include graphics rendering logic configured to receive graphics data (e.g. from an application running on a computer system) and render the graphics data to provide a rendering output. For example, the graphics data provided to a graphics processing system may describe geometry within a three dimensional (3D) scene to be rendered, and the rendering output may be a rendered image of the scene.

Some graphics processing systems (which may be referred to as "tile-based" graphics processing systems) use a rendering space which is subdivided into a plurality of tiles. The "tiles" are regions of the rendering space, and may have any suitable shape, but are typically rectangular (where the term "rectangular" includes square). To give some examples, a tile may cover a 16×16 block of pixels or a 32×32 block of pixels of an image to be rendered. Therefore, a tile of the rendering space corresponds to a region of the rendered image. As is known in the art, there are many benefits to subdividing the rendering space into tiles. For example, subdividing the rendering space into tiles allows an image to be rendered in a tile-by-tile manner, wherein graphics data for a tile can be temporarily stored "on-chip" during the rendering of the tile.

Tile-based graphics processing systems typically operate in two phases: a geometry processing phase and an image rendering phase. In the geometry processing phase, the graphics data for a render is analysed to determine, for each of the tiles, which graphics data items are present within that tile. Then in the image rendering phase, a tile can be rendered by processing those graphics data items which are determined to be present within that tile (without needing to process graphics data items which were determined in the geometry processing phase to not be present within the particular tile). The graphics data items may represent geometric shapes, which describe surfaces of structures in the scene, and which are referred to as "primitives". A common primitive shape is a triangle, but primitives may be other 2D shapes or may be lines or points also. Objects can be composed of one or more (e.g. hundreds, thousands or millions) of such primitives.

In some computing systems, a rendered image which is rendered by graphics rendering logic may be subsequently processed by image processing logic. In this way, post-processing can be performed on the rendered image. For example, the image processing logic may apply video encoding to the rendered image to encode the image. Applying video encoding to a rendered image may reduce the amount of data used to represent the image. This can be particularly useful if the image is to be transmitted across a network (e.g. over the internet or a local network, e.g. using WiFi) or if the image is to be stored. As an example, an image is may represent a frame within a sequence of frames which are to be rendered and encoded at a computing system and then transmitted to a display for display thereon in real-time. Video encoding methods are known in the art, which typically conform to a video encoding standard. There are many different video encoding standards, such as the H.265, H.264, VP8, VP9, DivX video standards, and many more. An aim of encoding an image is often to reduce the amount of data that is used to represent the image. Therefore, the encoding of the image may involve some compression of the image. The compression may be lossless or lossy.

There is often redundancy in the initial image data which represents the values of each of the pixels in the image, because there is often some correlation between pixel values in the image, e.g. for pixels which are located next to, or at least near to, each other in the image. For example, the colour of a group of pixels which all have the same colour can be compressed (losslessly) by storing the colour once along with some grouping information to represent the colour of all of the pixels of the group rather than by storing the colour multiple times, i.e. once for each of the pixels. The more redundancy there is in the image, the more the image can be compressed without losing any of the information in the image. A quantization parameter (QP) can be used by the encoder to regulate how much detail is saved in the image. For example, when the QP used by the encoder is very small, almost all the detail in the image is retained. When the QP used by the encoder is increased, some of the detail in the image is aggregated so that the bit rate of the encoded image drops, but at the price of some increase in distortion and some loss of quality of the encoded image.

It may be beneficial for an encoder to provide an encoded image at a constant (or near constant) bitrate both across the image, and when the image is a frame within a video stream comprising multiple frames across the different frames of the video stream. A buffer may be used, and operated as a 'leaky bucket', which is emptied at a constant rate whilst being filled at a variable rate with encoded image data from the video encoder. A rate controller may be used to adjust the QP used by the video encoder in accordance with a target bitrate and such that the buffer is not depleted or saturated. The rate controller may receive feedback from the is video encoder to indicate the number of bits that have been generated by encoding previous images and/or previous sections of an image currently being encoded. The rate controller may use the feedback to determine how the QP should be varied for encoding subsequent images and/or subsequent sections of an image currently being encoded.

The redundancy in an image may vary significantly from image to image as well as from one section of an image to another section of that same image. It may be that the image can be encoded only once (e.g. when the image is encoded in real-time), such that an image is not re-encoded if too few or too many bits are generated, relative to the target bitrate, by encoding the image. Furthermore, in order to reduce the storage requirements of the buffer and to keep the latency of the encoding of the image to an acceptably low level, the size of the buffer is constrained. Furthermore, larger variations in the QP used to encode different sections of the same image may result in a perceptually lower quality encoded image. Therefore, the rate controller might not allow the QP to vary by more than a threshold amount for the encoding of an image.

The constraints mentioned above can result in cases in which the rate controller does not optimally (or even nearly optimally) control the QP used by the video encoder to encode the sections of an image (e.g. when the image is encoded in real-time). For example, the amount of detail in an image may be localised, e.g. the bottom quarter of the image may include more detail than the rest of the image. In this situation, the rate controller may be operating well within a bit budget for three quarters of the image, using up three quarters of the bit budget. However, when the video encoder encodes the bottom quarter of the image containing a high level of detail, the rate controller is forced to increase the QP (compared to that which would be well suited for encoding the level of detail in the bottom quarter of the image) in order for the video encoder to stay within the bit budget. Changing the QP in this way may result in a perceptually low quality encoded image.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

In examples described herein a computing system comprises graphics rendering logic and image processing logic. The graphics rendering logic processes graphics data to render an image using a rendering space which is sub-divided into a plurality of tiles. In this sense the graphics rendering logic may be considered to be "tile-based" rendering logic. The graphics rendering logic comprises cost indication logic which obtains a cost indication for each of a plurality of sets of one or more tiles of the rendering space. The cost indication for a set of one or more tiles is suggestive of a cost of processing rendered image values for a region of the rendered image corresponding to the set of one or more tiles. For example, a cost indication for a tile may be based on a number of primitives in the tile. The image processing logic processes rendered image values for regions of the rendered image in dependence on the cost indications for the corresponding sets of one or more tiles. Use of the cost indications can improve the processing of the image processing logic.

There is provided a computing system comprising:
graphics rendering logic configured to process graphics data to render an image using a rendering space which is sub-divided into a plurality of tiles, the graphics rendering logic comprising cost indication logic configured to obtain a cost indication for each of a plurality of sets of one or more tiles of the rendering space, wherein the cost indication for a set of one or more tiles is suggestive of a cost associated with processing rendered image values for a region of the rendered image corresponding to the set of one or more tiles; and
image processing logic configured to process rendered image values for regions of the rendered image;
wherein the computing system is configured to cause the image processing logic to process rendered image values for regions of the rendered image in dependence on the cost indications for the corresponding sets of one or more tiles.

Furthermore, there is provided a computer-implemented method of processing graphics data, the method comprising:
processing graphics data to render an image using a rendering space which is sub-divided into a plurality of tiles, said processing of the graphics data comprising obtaining a cost indication for each of a plurality of sets of one or more tiles of the rendering space, wherein the cost indication for a set of one or more tiles is suggestive of a cost associated with processing rendered image values for a region of the rendered image corresponding to the set of one or more tiles; and
processing rendered image values for regions of the rendered image in dependence on the cost indications for the corresponding sets of one or more tiles, thereby determining a processed image.

For example, the computing system may be configured to cause the image processing logic to process rendered image values for regions of the rendered image in dependence on the cost indications for the corresponding sets of one or more tiles by controlling one or both of: an order in which regions of the rendered image are processed by the image processing logic, and a level of quality with which regions of the rendered image are processed by the image processing logic. For example, the system may be configured to control the order in which regions of the rendered image are processed by the image processing logic such that a region of the rendered image corresponding to a set of one or more tiles which has a relatively high cost indication is processed by the image processing logic before a region of the rendered image corresponding to a set of one or more tiles which has a relatively low cost indication.

The image processing logic may be configured to: receive the rendered image values for regions of the rendered image and the cost indications for the corresponding sets of one or more tiles; and control the processing of the rendered image values for regions of the rendered image in dependence on the cost indications for the corresponding sets of one or more tiles. For example, the image processing logic may be configured to control the processing of the rendered image values for regions of the rendered image further in dependence on an indication of the total cost associated with processing all of the regions of the rendered image.

The graphics rendering logic is configured to: determine an order in which regions of the rendered image are to be processed by the image processing logic in dependence on the cost indications for the corresponding sets of one or more tiles; and cause the regions of the rendered image to be provided to the image processing logic in the determined order.

The graphics rendering logic may be configured to pass the regions of the rendered image to the image processing logic.

The computing system may further comprise a transmission unit configured to transmit, over a network, processed image values for the image processed by the image processing logic. The computing system may further comprise a memory configured to store processed image values for the image processed by the image processing logic.

In examples described herein the image processing logic comprises video encoding logic configured to encode the rendered image values for regions of the rendered image in dependence on the cost indications for the corresponding sets of one or more tiles. The video encoding logic may be configured to encode blocks of rendered image values of the rendered image. The blocks of the rendered image values may match the regions of the rendered image. The blocks of the rendered image values might not match the regions of the rendered image, wherein each block of the rendered image values overlaps with one or more of the regions of the rendered image, and in this case the blocks of the rendered image values may be encoded by the video encoding logic based on the one or more cost indications associated with said one or more overlapping regions of the rendered image.

The video encoding logic may be configured to: allocate budgets of data for the encoded regions of the rendered image in accordance with the cost indications for the corresponding sets of one or more tiles; and encode the regions of the rendered image in accordance with the respective allocated budgets of data. The video encoding logic may be configured to allocate budgets of data for the encoded regions of the rendered image by dividing a total data budget for the encoded image amongst the regions of the rendered image in accordance with the cost indications for the corresponding sets of one or more tiles.

The video encoding logic may be configured to: set quantisation parameters for encoding the regions of the rendered image in accordance with the cost indications for the corresponding sets of one or more tiles; and encode the regions of the rendered image in accordance with the respective quantisation parameters.

The image processing logic may comprise one or more of: image filtering logic configured to apply filtering to the rendered image values for regions of the rendered image in dependence on the cost indications for the corresponding sets of one or more tiles; and motion estimation logic configured to apply motion estimation to regions of the rendered image in dependence on the cost indications for the corresponding sets of one or more tiles, wherein the image represents a frame of a sequence of frames.

The computing system may be configured to cause the image processing logic to process rendered image values for regions of the rendered image in dependence on the cost indications for the corresponding sets of one or more tiles, in order to satisfy at least one of: a constraint on the amount of data used to represent each of the processed regions of the processed image output from the image processing logic; a constraint on the amount of data used to represent the processed image output from the image processing logic; a constraint on the timing at which each of the processed regions of the processed image are output from the image processing logic; and a constraint on the timing at which the processed image is output from the image processing logic.

The computing system may comprise control logic, implemented in one or both of the graphics rendering logic and the image processing logic, the control logic configured to cause the image processing logic to process rendered image values for regions of the rendered image in dependence on the cost indications for the corresponding sets of one or more tiles.

The cost indication for a set of one or more tiles may be based on one or more factors which influence a cost of processing rendered image values for a region of the rendered image corresponding to the set of one or more tiles. The cost indication logic may be configured to determine the cost indications for the sets of one or more tiles of the rendering space. For example, the cost indication logic may be configured to determine a cost indication for a tile of the rendering space based on one or more of the following factors: (i) a number of primitives in the tile; (ii) object types associated with the primitives in the tile; (iii) tile coverage area of the primitives in the tile; (iv) textures to be applied to primitives in the tile during the rendering of an image region corresponding to the tile; (v) a user input; and (vi) a cost associated with processing a corresponding image region in a previous frame, wherein the image represents a frame of a sequence of frames. The cost indication logic may be configured to quantise the cost indications.

The graphics rendering logic may comprise geometry processing logic and image rendering logic, wherein the geometry processing logic includes a tiling unit configured to generate control streams for the tiles of the rendering space indicating which primitives are present in the tiles, wherein the cost indication logic is implemented as part of the geometry processing logic, and wherein the image rendering logic is configured to render primitives in tiles of the rendering space in accordance with the generated control streams. The image rendering logic may be further configured to modify the cost indications.

The computing systems described herein may be embodied in hardware on an integrated circuit. There may be provided a method of manufacturing, at an integrated circuit manufacturing system, a computing system as described herein. There may be provided an integrated circuit definition dataset that, when processed in an integrated circuit manufacturing system, configures the system to manufacture a computing system as described herein. There may be provided a non-transitory computer readable storage medium having stored thereon a computer readable description of an integrated circuit that, when processed, causes a layout processing system to generate a circuit layout description used in an integrated circuit manufacturing system to manufacture a computing system as described herein.

There may be provided an integrated circuit manufacturing system comprising:
    a non-transitory computer readable storage medium having stored thereon a computer readable integrated circuit description that describes a computing system as described herein;
    a layout processing system configured to process the integrated circuit description so as to generate a circuit layout description of an integrated circuit embodying the computing system; and
    an integrated circuit generation system configured to manufacture the computing system according to the circuit layout description.

There may be provided computer program code for performing any of the methods described herein. There may be provided non-transitory computer readable storage medium having stored thereon computer readable instructions that, when executed at a computer system, cause the computer system to perform any of the methods described herein.

The above features may be combined as appropriate, as would be apparent to a skilled person, and may be combined with any of the aspects of the examples described herein.

BRIEF DESCRIPTION OF THE DRAWINGS

Examples will now be described in detail with reference to the accompanying is drawings in which.

Figure 1:
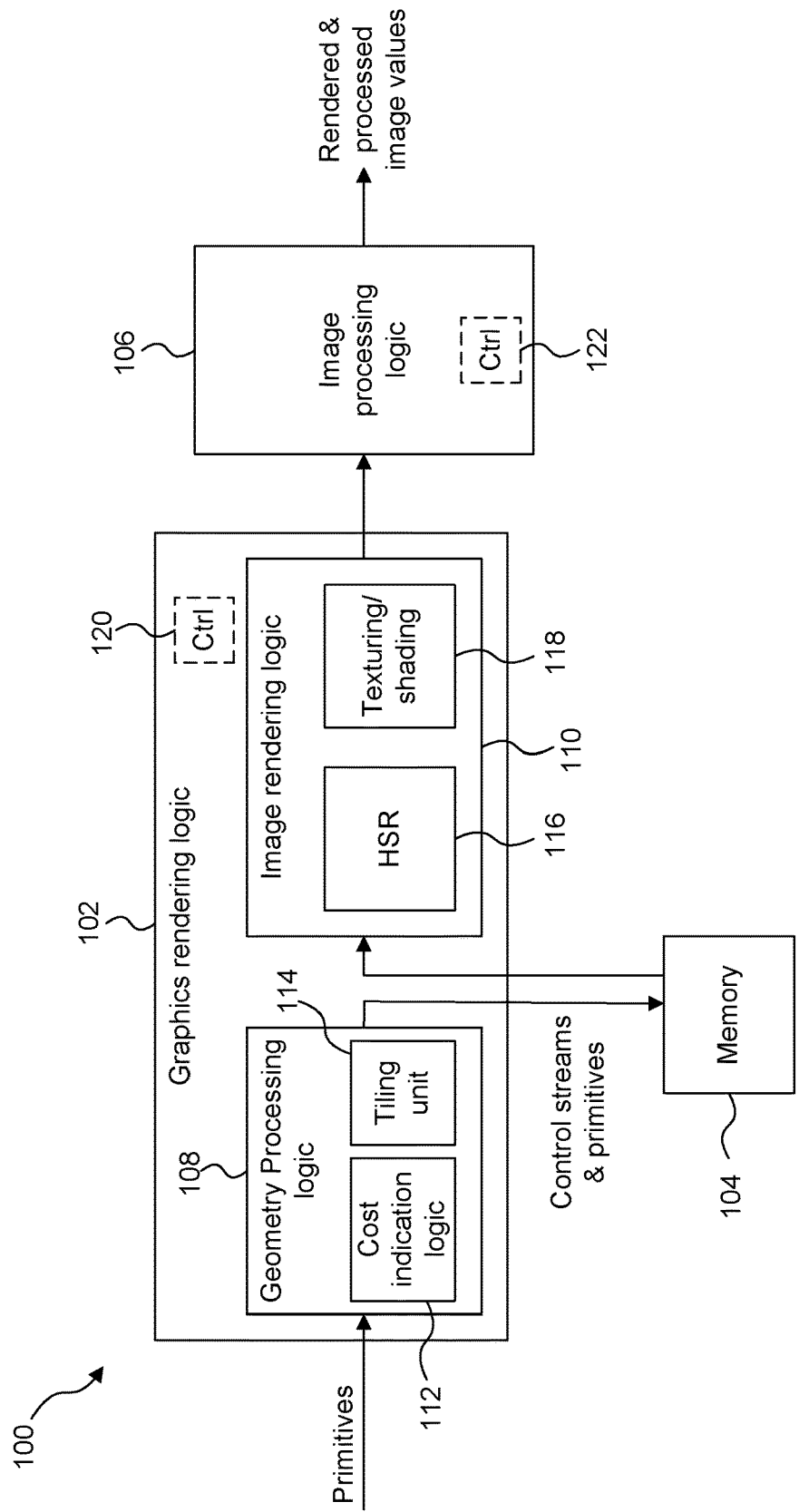
FIG. 1 shows a computing system.

The accompanying drawings illustrate various examples. The skilled person will appreciate that the illustrated element boundaries (e.g., boxes, groups of boxes, or other shapes) in the drawings represent one example of the boundaries. It may be that in some examples, one element may be designed as multiple elements or that multiple elements may be designed as one element. Common reference numerals are used throughout the figures, where appropriate, to indicate similar features.

DETAILED DESCRIPTION

Computing systems are described herein in which graphics rendering logic renders an image, which is then subsequently processed by image processing logic (e.g. video encoding logic) to apply post-processing (e.g. video encoding) to the rendered image. The post-processing may commence on an image after the whole of the image has been rendered. Alternatively, the post-processing may commence on portions of an image when those portions have been rendered, even if the rendering of other portions of the image has not yet been completed. Some information about the complexity of the rendered image can be gathered during the rendering process which may be useful to improve the performance (e.g. efficiency, speed, quality, etc.) of the processing that is applied to the rendered image by the image processing logic. For example, a tile-based graphics processing system inherently involves two passes over the geometry for an image being rendered: as described in more detail below, a first pass is a geometry processing phase in which for each tile of the rendering space indications of the primitives which are relevant to the rendering of that tile are determined and stored (e.g. in control streams); and a second pass is a rendering phase in which a tile is rendered using the primitive indications in the control stream for a particular tile to identify which primitives are relevant for the rendering of the tile, such that relevant data can be fetched for the rendering of the tile. Therefore, the geometry processing phase has a chance to process all of the data for an image being rendered (in the geometry processing phase) before the time at which the image rendering is complete. This means that the geometry processing phase can determine information about the image (e.g. cost indications for tiles of the image), which can be useful for the subsequent image processing of the rendered image.

In examples described herein as part of the geometry processing phase, cost indication logic determines a cost indication for each set of one or more tiles. For example, the cost indication for a tile may be a count of the primitives which are present in that tile. The cost indication for a tile may be based on other factors which influence a cost of subsequently processing, in the image processing logic, the rendered image values for a region of the rendered image corresponding to the tile. The cost indications provide information relating to the processing complexity of different regions of the rendered image and can therefore be used to control the processing performed on respective regions of the rendered image by the image processing logic. That is, the cost indications can be used as a factor in determining how the image processing logic processes respective regions of the rendered image. This principle can be applied in different ways in different examples, as described in more detail below.

As an example, when a frame of a video sequence has been rendered it may be passed to a video encoder which encodes the frame according to a video encoding technique. For example, the cost indications for the sets of one or more tiles may be provided to the video encoder with the rendered image data. The encoded video data is generally a compressed representation of the frames, which is suitable for transmission (e.g. to a display for display thereon) and/or for storage. As part of the video encoding, quantisation levels may be selected for encoding regions of a frame. The cost indications for the different tiles may be used to help the video encoder select suitable quantisation levels for encoding regions of the rendered image corresponding to the different tiles.

FIG. 1 shows some elements of a computing system 100 which may be used to render and subsequently process an image of a 3D scene. The computing system 100 comprises graphics rendering logic 102 (e.g. implemented on a Graphics Processing Unit (GPU)), a memory 104 and image processing logic 106. The graphics rendering logic 102 comprises geometry processing logic 108 and image rendering logic 110. The geometry processing logic 108 comprises cost indication logic 112 and a tiling unit 114. The geometry processing logic 108 is configured to implement a geometry processing phase of the graphics rendering process and as such may include further elements to those shown in FIG. 1 such as a transformation unit and a clipping/culling unit, as would be apparent to a person skilled in the art. The image rendering logic 110 comprises a hidden surface removal (HSR) unit 116 configured to perform hidden surface removal on primitive fragments for removing primitive fragments which are hidden by other primitive fragments, and a texturing/shading unit 118 configured to perform texturing and/or shading on graphics data (e.g. primitive fragments) for tiles of the rendering space. The graphics rendering logic 102 may comprise control logic 120, and the image processing logic 106 may comprise control logic 122.

Figure 2:
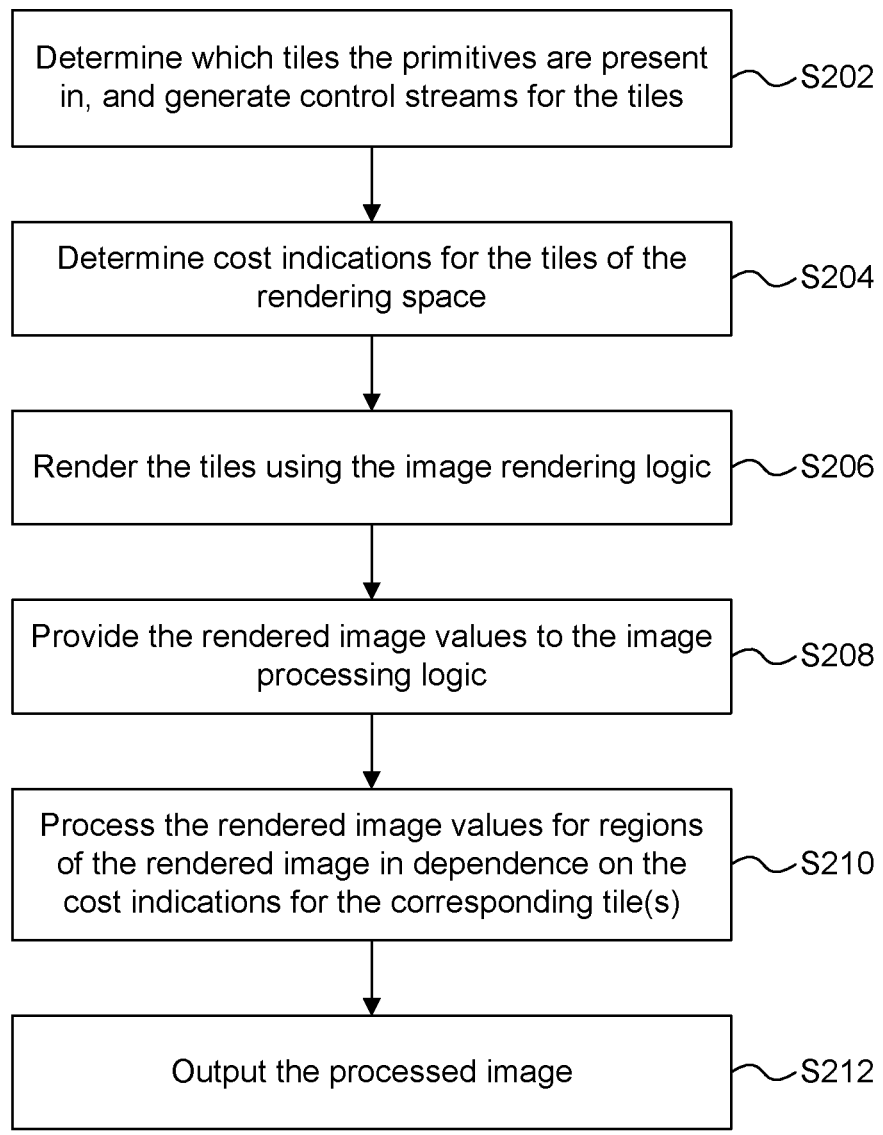
FIG. 2 is a flow chart for a method of processing graphics data using the computing system.

The graphics processing system 100 is arranged such that a sequence of primitives provided by an application is received at the geometry processing logic 108. An example operation of the computing system 100 is described with reference to the flow chart shown in FIG. 2.

Steps S202 and S204 are part of the geometry processing phase implemented by the geometry processing logic 108. In step S202 the tiling unit 114 determines which primitives are present within each of the tiles of the rendering space of the graphics processing system 100. The tiling unit 108 assigns primitives to tiles of the rendering space by creating control streams (or "display lists") for the tiles, wherein the control stream for a tile includes indications of primitives which are present within the tile. The control streams and the primitives are outputted from the tiling unit 108 and stored in the memory 104.

In step S204 the cost indication logic 112 determines cost indications for the tiles of the rendering space. As described above, the cost indication for a tile suggests a cost associated with processing a corresponding region of the rendered image in the image processing logic 106. For example, the cost indication for a tile may suggest a cost of processing a corresponding region of the rendered image in the image processing logic 106. As another example, the cost indication for a tile may suggest a cost (e.g. an amount of data) which will result from processing a corresponding region of the rendered image in the image processing logic 106. In general as described below, cost indications may be determined for sets of one or more tiles, i.e. a cost indication may be determined for a tile and/or a cost indication may be determined for a set of tiles. For simplicity some of the explanation herein refers to there being a cost indication for a tile, but in general it is to be understood that this explanation could be extended to having a cost indication for a set of tiles.

The cost indications may take different forms in different examples. In some examples, the cost indication for a tile may be an estimate of a processing cost that will be incurred when a region of the rendered image corresponding to the tile is processed by the image processing logic 106. A processing cost could be a length of processing time, a number of computation operations performed, a processing power consumed, a number of reads/writes from/to memory, or any other suitable measure of the cost of processing the region of the rendered image. However, in some examples, the cost indication for a tile might not be a direct estimate of a processing cost. The cost indication for a set of one or more tiles may be based on the content of the set of one or more tiles. The cost indication for a set of one or more tiles may be based on one or more factors which influence a cost of processing the region(s) of the rendered image corresponding to the set(s) of one or more tiles. For example, a cost indication could be a number of is primitives which are present in a tile. The number of primitives in a tile is not a direct estimate of the cost (e.g. the processing time, power consumption, number of operations, or amount of data resulting from the processing etc.) associated with processing the corresponding region, but it is indicative of an approximate cost that is likely to be associated with processing the corresponding region. For example, a larger number of primitives in a tile may suggest that there is more image detail in the corresponding region of the rendered image such that processing performed on the region of the rendered image by the image processing logic 106 may incur a greater processing cost and/or may produce data which cannot be compressed as much. This is because a larger number of primitives in a tile tends to mean that there are more objects in the tile, which in turn tends to mean that there is more detail in the corresponding image region. The number of primitives in a tile is very simple to calculate in the tiling unit 114 because it can be directly observed from the control stream for the tile, i.e. the number of primitive identifiers included in the control stream for a tile at the end of the tiling phase indicates the number of primitives in that tile. So in this example, the cost indication logic 112 does not add significant complexity to the geometry processing logic 108.

In a broad sense, the cost indication for a tile could be any parameter which is suggestive of a cost associated with processing the corresponding region of the rendered image, i.e. a parameter which provides some measure of likely cost for use in distinguishing between tiles. It is further noted that the cost indications might not always accurately reflect the true processing costs of processing the corresponding regions of the rendered image, but they aim to provide a better indication of processing costs for regions of the rendered image than if no cost indications were determined at all.

In a slightly more complex example, the cost indication logic 320 determines the cost indication for a tile by combining scores associated with primitives which are present in a tile. The score associated with a primitive may be dependent upon an object type of an object of which the primitives is a part. For example, primitives may be associated with object types such as opaque, translucent or punch through. Object type could affect image complexity, e.g. a punch-through object type may indicate more discontinuities in the image than the primitive count might otherwise suggest, such that the image complexity may be increased when punch-through objects are included. For example, video encoders produce the most compact encoded output when encoding flat regions of colour in an image. Primitives with object types representing transparent, translucent or punch-through geometry are more likely (compared to opaque primitives) to create none flat colour regions that are more expensive for the video encoder to handle.

Tessellation is a technique which allows a graphics data item (which may be referred to as a "patch") to be expanded into many primitives during rendering. In the case of tessellation, it may be the patches (rather than the expanded primitives) which are sorted into tiles in step S202. A patch may be associated with a higher cost than a standard triangular primitive which has been sorted into a tile. Tessellation can be useful for representing complex (e.g. curved) surfaces, but can result in a large number of primitives being rendered. Tessellation can also be used to make surfaces more detailed or bumpy. A cost indication for a tile could be based on whether tessellation is applied to a patch to form primitives in the tile. As an example, if a tile includes a patch to be tessellated, a cost indication for the tile could be higher, e.g. the cost indication for the tile could depend upon the number of triangles which result from the tessellation of the patch.

In other examples the cost indications may be determined in different ways and in general, any cost could be used, but how appropriate a particular cost would be to a given scene may vary. For example, the tile coverage area of the primitives in a tile may be considered when determining the cost indication for the tile. The tile coverage area of a primitive may indicate a number of sample positions within the tile which are overlapped by that primitive, and therefore provides some indication of the processing complexity that will be involved when processing the region of the rendered image corresponding to the tile in the image processing logic 106. In some examples, a user could provide a user input to guide the determination of the cost indications for the tiles. In this sense the cost indication logic 112 may is receive the cost indications for the tiles via an input. For example, a user may be able to specify the cost indications for the tiles directly, e.g. via an API extension, to allow a developer to explicitly provide tile costs to ensure efficient performance using a priori knowledge of the workloads associated with particular tiles.

The geometry processing logic 108 may have access to information relating to a texture which is to be applied to primitives in a tile by the texturing/shading unit 118 during rendering of the tile. The cost indication for the tile may depend upon the textures that are to be applied to the primitives in the tile. For example, if a texture to be applied to a primitive in a tile includes a high level of image detail then the complexity of the image processing performed on the tile by the image processing logic 106 may be higher than if the texture had a relatively low level of image detail. For example, the cost indication logic 112 may determine a score for a texture, the score being indicative of the complexity of performing image processing on rendered primitives which have that texture applied thereto. A texture-dependent score can be associated with each primitive in a tile, wherein a total score associated with the primitives in the tile can be determined (e.g. as a sum of the individual scores of the primitives in the tile) and used to determine the cost indication for the tile.

In the examples described above, factors relating to the current render can be used to estimate likely processing costs for processing regions of the current rendered image. As well as these factors, the cost indication logic 112 could determine the processing costs (either predicted or actual costs of the processing performed by the image processing logic 106) for regions of the rendered image corresponding to tiles of a previous render (e.g. the immediately preceding render, e.g. the preceding frame), and can use these as a factor in determining the cost indications for the tiles of the current render. Two frames of a sequence of frames are likely to be similar if they are close to each other in the sequence, e.g. if they are consecutive frames, unless there is a scene change or a sudden change in the content. Therefore, the costs associated with regions of the rendered image corresponding to particular tiles in a previous frame provide a good indication of the costs associated with processing corresponding regions in a current frame. Where actual costs of a previous rendered image are used, indications of the actual costs may be fed back from the image processing logic 106 to the cost indication logic 112.

To summarise some of the examples described above, the cost indication logic 112 may determine a cost indication for a tile of the rendering space based on one or more of the following factors: (i) a number of primitives in the tile; (ii) object types associated with the primitives in the tile; (iii) tile coverage area of the primitives in the tile; (iv) textures to be applied to primitives in the tile during the rendering of an image region corresponding to the tile; (v) a user input; and (vi) a cost associated with a corresponding image region in a previous frame, wherein the image represents a frame of a sequence of frames. However, it will be apparent that other factors may be used in other examples for determining the cost indications. The cost indication logic 112 may determine the cost indication for a tile based on a plurality of the factors, e.g. according to any suitable combination, which may or may not be weighted in favour of one factor over another factor.

As described above a cost indication may be determined for each set of one or more tiles. It may be the case that each set of one or more tiles comprises the same number of tiles. In some examples the sets of one or more tiles each comprise a single tile. In other examples, the sets of one or more tiles each comprise a plurality of tiles. The sets of tiles may be blocks of tiles (e.g. contiguous tiles) of the rendering space. The size and shape of the sets of one or more tiles may be selected to match corresponding regions of a rendered image which can be processed by the image processing logic 106. If the image processing logic 106 is configured to process large regions of a rendered image at a time, then the sets of tiles may correspondingly include more tiles than if the image processing logic 106 was configured to process smaller regions of the rendered image at a time.

In some examples, the size of the tiles that are processed by the graphics rendering logic 102 does not match the size of blocks that are processed by the image processing logic 106. As an example, the each tile in the graphics rendering logic 102 may represent a 32×32 block of pixels, whereas a video encoder may encode 8×8 blocks of pixels. In this example, a 32×32 pixel region of the rendered image may be associated with the cost indication determined for a corresponding tile, and the cost indication can be used for all of the 8×8 blocks of pixels within the region in order to control the processing of the rendered image in the image processing logic 106 accordingly. Therefore, a mismatch between the tile size of the graphics rendering logic 102 and the block size used by the image processing logic 106 does not cause a problem. In the example mentioned above, the tile size is an integer multiple of the block size for the image processing logic 106 so the association of cost indications to encoder blocks is simple. However, in other examples, the tile size might not be an integer multiple of the block size for the image processing logic 106. Other ways of determining cost indications for blocks from the cost indications for tiles may be implemented, for example, cost indications for more than one tile may be combined to determine cost indications for blocks to be processed by the image processing logic 106. For example, a cost indication for a block to be processed by the image processing logic 106 may be determined by filtering, smoothing or averaging the cost indications for multiple tiles. For example, if a block overlaps with more than one tile then the cost indication for the block may be determined by determining an average of the cost indications for the overlapped tiles. The average may be a weighted average, where for example, the weights are determined based on the number of pixels of the block which overlap with the different tiles. In general, if the blocks used by the image processing logic 106 do not match the tiles of the graphics rendering logic 102 (and therefore do not match the regions of the rendered image for which cost indications are associated), each block of the rendered image values overlaps with one or more of the regions of the rendered image, and the blocks of the rendered image values are processed by the image processing logic 106 (e.g. encoded by the video encoding logic) based on the one or more cost indications associated with the one or more overlapping regions of the rendered image.

The cost indication logic 112 may quantise the cost indications. In particular, the quantised cost indications may be quantised to be represented by a number of bits, e.g. the number of bits being in a range from 1 to 8. In an extreme example, the quantised cost indications each have a single bit, such that they act as a flag to indicate that a tile is either a high cost tile or a low cost tile. Even when the cost indications are quantised to this extent the use of the cost indications can be useful for controlling the processing of regions of the rendered image corresponding to the tiles because it will tend to avoid situations where a high cost region is unexpectedly scheduled for processing near the end of processing an image at the image processing logic 106, which can detrimentally affect the quality of the processed image. Quantising the cost indications reduces the amount of data used to store the cost indications, and may simplify the way in which the image processing logic 106 processes the rendered regions of the image by limiting the number of different values that the cost indications can take.

Figures 3A, 3B:
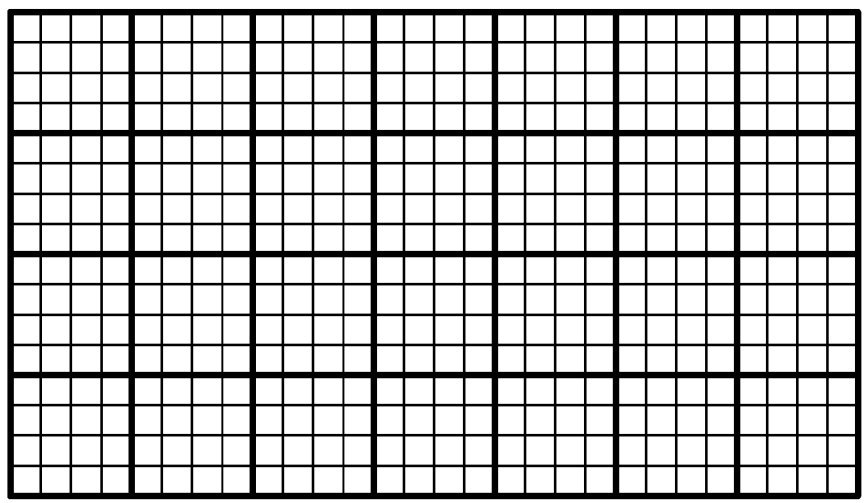
FIG. 3a shows sets of tiles of a rendering space.
FIG. 3b illustrates cost indications for the sets of tiles of the rendering space.

FIGS. 3a and 3b illustrate an example of cost indications determined for blocks of tiles. FIG. 3a shows a rendering space 302 which has 896×512 pixels. Each tile is a 32×32 block of pixels, such that the rendering space 302 has 28 columns and 16 rows of tiles as shown in FIG. 3a. The tiles are grouped together into 4×4 sets as shown by the bold lines in FIG. 3a, wherein each 4×4 set of tiles corresponds to a region of the rendered image to be processed by the image processing logic 106.

In this example, the cost indication logic 112 obtains cost indications for each of the tiles in the rendering space, either by determining the cost indications or by receiving the cost indications via an API as described above. A cost indication is then determined for each of the 4×4 sets of tiles based on the cost indications of the tiles within the respective sets. To give some examples, the cost indication logic may determine the cost indication for a set of tiles by determining: (i) an average of the cost indications of the tiles within that set, (ii) a sum of the cost indications of the tiles within that set, (iii) a maximum of the cost indications of the tiles within that set, or (iv) a number of the tiles within that set which have cost indications above a threshold. In other examples, the cost indications of tiles within a set may be combined in other ways to determine a cost indication for the set as a whole. Furthermore, in some examples, a cost indication is determined for a set of tiles without first determining individual cost estimates for the individual tiles within the set.

FIG. 3b shows cost indications for the 4×4 sets of tiles shown in FIG. 3a. In this example, cost indications are determined for each of the tiles and then the cost indication for a 4×4 set of tiles is determined by combining the cost indications for the individual tiles within that set of tiles (e.g. by finding the sum of the individual cost indications) and then quantising the cost indications down to a 4-bit value. 4-bit values are in a range from 0 to 15. It can be seen that there is a region near the bottom right of the rendering space 302 which is relatively costly to process, e.g. because the graphics content in this region is particularly detailed (e.g. a high number of primitives in this region). In contrast, the top left region of the rendering space 302 is not so costly to process, e.g. because the graphics data in this region is simple, e.g. this region may represent a plain background with little detail in the scene.

The determined cost indications may be stored in memory 104. For example, the tiling unit 114 may include the determined cost indications in the control streams for the tiles to be stored in the memory 104. In some examples, the tiling unit 114 could include the determined cost indications in a tail pointer cache which includes pointers to the ends of the lists of primitive IDs for respective tiles. The pointers can be included in the tail pointer cache for the tiles of a rendering space at the end of processing the geometry for a render in the tiling unit 114, and at this point the cost indication logic 112 has determined the cost indications for the tiles, so this is a good opportunity to add the cost indications in a suitable place in the control streams without having to significantly alter the operation of the tiling unit 114. At the end of the geometry processing phase the control streams for the tiles (including the cost indications) are stored in the memory 104. In other examples, the tiling unit 114 could include the determined cost indications in region headers of the control stream. The exact placement of the cost indications may be different in different examples, and this is an implementation choice.

Step S206 represents a rendering phase in which the image rendering logic 110 renders graphics data for tiles of the rendering space to generate values of a render, e.g. rendered image values. The image rendering logic 110 may be configured to implement any suitable rendering technique, such as rasterisation or ray tracing to perform the rendering. In order to render a tile, the control stream for a tile is fetched from the memory 104 and the primitives relevant to that tile (as indicated by the control stream for the tile) are fetched from the memory 104. For example, the image rendering logic 110 may implement rasterisation according to a deferred rendering technique, such that hidden surface removal is performed by the HSR unit 116 to thereby remove fragments of primitives which are hidden in the scene, and texturing and/or shading is applied to the remaining primitive fragments by the texturing/shading unit 118 to thereby form rendered image values. Methods of performing hidden surface removal and texturing/shading are known in the art. The term "fragment" refers to a sample of a primitive at a sampling point, which is to be processed for rendering pixels of an image. In some examples, there may be a one to one mapping of sample positions to pixels. In other examples there may be more sample positions than pixels, and this oversampling can allow for higher quality rendering of pixel values, e.g. by facilitating anti-aliasing and other filtering that may be applied to multiple fragments for rendering each of the pixel values. The texturing and/or shading performed on the fragments which pass the HSR stage determines pixel colour values of a rendered image. Texture data may be received at the image rendering logic 110 from the memory 104 in order to apply texturing to the primitive fragments, as is known in the art. Shader programs may be executed to apply shading to the primitive fragments. The texturing/shading process may include applying further processing to the primitive fragments (e.g. alpha blending and other processes), as is known in the art in order to determine rendered pixel values of an image. The image rendering logic 110 processes primitives in each of the tiles. The rendered image values for one or more tiles can be outputted from the graphics rendering logic 102 and provided to the image processing logic 106.

The graphics rendering logic 102 described above implements a deferred rendering system because, where possible (e.g. for opaque primitive fragments), the image rendering logic 110 is configured to perform the HSR processing on a primitive fragment before the texturing/shading processing is applied to the primitive fragment. For some primitive fragments (e.g. translucent fragments, punch-through fragments or fragments whose depth values can be modified by shaders or texturing), the visibility of the primitive fragment cannot be conclusively determined before the texturing and/or shading processing has been applied to the primitive fragment. Therefore, these fragments are passed to the texturing/shading unit 118 before the hidden surface removal has been completed and then the results of the texturing and/or shading (which conclusively define the visibility of the fragments) are passed back to the HSR unit 116 so that hidden surface removal can be completed for those fragments. The details of the mechanism by which the image rendering logic 110 handles the processing of primitive fragments whose visibility cannot be determined before they have been textured and/or shaded (e.g. translucent fragments, punch-through fragments or fragments whose depth values can be modified by shaders or texturing) will vary in different embodiments, and are beyond the scope of this disclosure. Other graphics processing systems are not deferred rendering systems in the sense that they are configured to perform the texturing and/or shading of primitive fragments before the HSR is performed on those primitive fragments, even for opaque primitive fragments. Deferred rendering systems avoid the processing involved in applying texturing and/or shading to at least some of the primitive fragments (e.g. opaque primitive fragments) which are removed by the hidden surface removal process.

In step S208 the image values of the rendered image are passed from the graphics rendering logic 102 to the image processing logic 106. The image values may be passed via a buffer, not shown in FIG. 1, (or via memory 104, or another memory) between the graphics rendering logic 102 and the image processing logic 106. As mentioned above, the rendered image values for an image may be provided to the image processing logic 106 when the whole image has been rendered by the graphics rendering logic 102. Alternatively, the rendered image values for a set of one or more regions of the rendered image may be provided to the image processing logic 106 when those regions have been rendered, rather than waiting for the whole of the image to be rendered before passing any of the rendered image values to the image processing logic 106. The cost indication may also be passed from the graphics rendering logic 102 to the image processing logic 106.

In step S210 the image processing logic 106 processes rendered image values for regions of the rendered image in dependence on the cost indications for the corresponding sets of one or more tiles, thereby determining a processed image. The processing performed by the image processing logic 106 may be different in different examples, as explained in more detail below.

The computing system 100 is configured to cause the image processing logic 106 to process rendered image values for regions of the rendered image in dependence on the cost indications for the corresponding sets of one or more tiles. For example, control logic may be implemented in one or both of the graphics rendering logic and the image processing logic (as shown in FIG. 1 with control logic 120 and 122), wherein the control logic may be configured to cause the image processing logic 106 to process rendered image values for regions of the rendered image in dependence on the cost indications for the corresponding sets of one or more tiles. In some examples, the cost indications for the tiles may be provided to the image processing logic 106. In these examples, the image processing logic 106 may receive the rendered image values for regions of the rendered image and the cost indications for the corresponding sets of one or more tiles, and may control the processing of the rendered image values for regions of the rendered image in dependence on the cost indications for the corresponding sets of one or more tiles. The image processing logic 106 may control the processing of the rendered image values for regions of the rendered image further in dependence on an indication of the total cost associated with processing all of the regions of the rendered image. As an example, the image processing logic 106 may have a total processing budget that can be allocated to processing an image or a total bit budget for a processed image, and these budgets may be allocated to the regions of the image based on the proportion of the total cost which is indicated by the cost indications associated with the respective regions. For example, where the image processing logic 106 is performing video encoding, knowledge of the total bit budget of the encoded image, and the cost indications for the regions of the image (which indicate the amounts of encoded data which are likely to represent the encoded regions of the image) allows the image processing logic 106 to plan ahead, to try to distribute the available bits appropriately across the encoded image.

However, in other examples, the cost indications for the tiles are not provided to the image processing logic 106 but are instead used at the graphics rendering logic 102 (e.g. by the control logic 120) to determine an order in which regions of the rendered image are provided to the image processing logic 106 for processing thereon. In other words, the graphics rendering logic 102 may determine an order in which regions of the rendered image are to be processed by the image processing logic 106 in dependence on the cost indications for the corresponding sets of one or more tiles, and the graphics rendering logic 102 may cause the regions of the rendered image to be provided to the image processing logic 106 in the determined order. In some examples, rendered tiles of a frame are streamed straight from the graphics rendering logic 102 into the image processing logic 106 without storing the whole frame in memory. When costs are determined in the tiling phase (i.e. in the geometry processing logic 108) the order in which the tiles are rendered by the image rendering logic 110 can be controlled, thereby controlling the order in which tiles are sent to, and encoded by, the image rendering logic 110. It may be simple to choose to render tiles in any order in the image rendering logic 110, but often image processing logic 106 (e.g. video encoders) do not allow a completely free choice of what order the blocks of an image are processed (e.g. encoded) in. For example, some image processing logic blocks may require tiles to be submitted in raster order, whilst other image processing logic blocks may allow a choice between some fixed patterns in which tiles are submitted, or may have various other constraints.

More broadly, an order in which regions of the rendered image are processed by the image processing logic 106 may be controlled in dependence on the cost indications for the corresponding sets of one or more tiles. For example, the image processing logic 106 may be controlled to process the high cost regions of the rendered image before lower cost regions of the rendered image, and in some examples the high cost regions may be rendered before lower cost regions of the image. In other words, the computing system 100 may control the order in which regions of the rendered image are processed by the image processing logic 106 such that a region of the rendered image corresponding to a set of one or more tiles which has a relatively high cost indication is processed by the image processing logic 106 before a region of the rendered image corresponding to a set of one or more tiles which has a relatively low cost indication. This can avoid a situation in which a high-cost region of an image is processed by the image processing logic 106 near the end of a render, e.g. when there may not be adequate bits remaining for a good encoding of this region in the example of the image processing being video encoding.

A level of quality with which regions of the rendered image are processed by the image processing logic 106 may be controlled in dependence on the cost indications for the corresponding sets of one or more tiles. For example, a perceived quality of the processed image may be greater if regions of the image which have a high level of image detail are processed with a higher level of quality than regions of the image which have a relatively low level of image detail. For example, if the image processing logic 106 is a video encoder for encoding the rendered image then regions of the image with more image detail may be provided with a larger bit budget for the encoded data than regions of the image with less image detail.

As mentioned above, the image processing logic 106 may comprise video encoding logic configured to encode the rendered image values for regions of the rendered image in dependence on the cost indications for the corresponding sets of one or more tiles.

As described above, the encoding of an image may involve some compression of the image, and the compression may be lossless or lossy. Redundancy in the rendered image data may arise, and a quantization parameter (QP) can be used by the video encoder to regulate how much detail is saved. When the QP used by the encoder is very small, almost all the detail in the image is retained. When the QP used by the encoder is increased, some of the detail in the image is aggregated so that the bit rate of the encoded image drops, but at the price of some increase in distortion and some loss of quality of the encoded image. It may be beneficial for an encoder to provide an encoded image at a constant (or near constant) bitrate both across the image, and when the image is a frame within a video stream comprising multiple frames across the different frames of the video stream. A rate controller may be used to adjust the QP used by the encoder in accordance with a target bitrate. A rate controller may receive feedback from the video encoder to indicate the number of bits that have been generated by encoding previous images and/or previous sections of an image currently being encoded. The rate controller may use the feedback to determine how the QP should be varied for encoding subsequent images and/or subsequent sections of an image currently being encoded. If a rate controller has no knowledge of the relative image detail in different regions of the rendered image, then it might struggle to optimally (or even nearly optimally) control the QP used by the video encoder to encode the sections of an image (e.g. when the image is encoded in real-time). The aim of controlling the QP used by the video encoder may be to maintain a constant bit rate of the encoded data. Alternatively, the aim of controlling the QP used by the video encoder may be to optimise quality of the encoded image, at the expense of short term bit rate variation. The cost indications, which provide a measure of image detail, can help with both of these aims.

In examples described herein, the computing system 100 has some knowledge of the relative image detail in different regions of the rendered image as indicated by the cost indications, and as such the video encoder can be controlled in a more optimal manner (compared to when no cost indications are provided). For example, if high cost image regions are provided to the video encoder to be processed before low cost image regions (if this is possible in the encoding method being used) then the video encoder will avoid a situation in which the is video encoder unexpectedly encounters a highly detailed region of the image near the end of the encoding of the image. This allows the video encoder to use suitable QPs for encoding the different regions of the image according to the level of detail in the respective regions of the image, without exceeding the available bit budget for the encoded image. In other words, the video encoding logic may set quantisation parameters for encoding the regions of the rendered image in accordance with the cost indications for the corresponding sets of one or more tiles, and encode the regions of the rendered image in accordance with the respective quantisation parameters.

In another example, the cost indications may be used such that the high cost regions are spread throughout the processing of an image by the image processing logic 106. This may help to smooth the processing load on the image processing logic 106. For example, the order in which the image processing logic 16 processes regions may be controlled to interleave the processing of high-cost regions and low-cost regions.

In other examples in which the cost indications are provided to the video encoding logic 106, the video encoding logic may allocate budgets of data for the encoded regions of the rendered image in accordance with the cost indications for the corresponding sets of one or more tiles, and encode the regions of the rendered image in accordance with the respective allocated budgets of data. For example, if the video encoding logic is provided with (or can determine) an indication of the total of the cost indications for the tiles of the rendered image as well as the individual cost indications, then the video encoding logic may allocate budgets of data for the encoded regions of the rendered image by dividing a total data budget for the encoded image amongst the regions of the rendered image in accordance with the cost indications for the corresponding sets of one or more tiles. For example, a proportion of the total data budget may be provided for a region corresponding to a tile in accordance with the ratio of the tile's cost indication to the total of the cost indications for the tiles in the rendered image.

In step S212 the processed image is output from the image processing logic 106, and may be used in any suitable manner. This output is shown in FIG. 1 as "rendered and processed image values". For example, the computing system 100 may further comprise a transmission unit (not shown in FIG. 1) which is configured to transmit, over a network (e.g. the internet or a local network, such as over a WiFi connection or a Bluetooth connection), the processed image values representing the image processed by the image processing logic 106. Methods of transmitting data are known in the art and the details of the transmission are beyond the scope of this disclosure.

The processed image may be provided to a display for display thereon. For example, the graphics rendering logic 102 may render a sequence of images in real-time and the images may be encoded with video encoding logic 106 and then transmitted to a display and displayed thereon in real-time.

Additionally, or alternatively, the processed image values output from the image processing logic 106 may be stored in a memory, e.g. in the memory 104 of the computing system 100.

In the examples described above the image processing logic 106 comprises video encoding logic. In other examples, the image processing logic 106 may perform other types of post-processing on the rendered image values of the rendered image in accordance with the cost indications. The cost indications provide an indication of the level of detail in different regions of the rendered image. For example, the image processing logic 106 may comprise image filtering logic configured to apply filtering to the rendered image values for regions of the rendered image in dependence on the cost indications for the corresponding sets of one or more tiles. For example, a filter kernel size used by the image filtering logic may be set based on the cost indications. For a highly-detailed region of the image, a smaller filter kernel may be better suited for a filtering process, whereas for a less-detailed region of the image a larger filter kernel may be better suited for a filtering process. This is because if an image region with lots of fine detail (e.g. an image region representing leaves of a tree) was filtered using a large filter kernel (e.g. "large" relative to a typical feature size of detail in the image) then the fine detail may be lost, or blurred, due to the filtering process; whereas if that image region was filtered using a small filter kernel (e.g. "small" relative to a typical feature size of detail in the image) then the fine detail may be maintained. Conversely, filtering an image region with only coarse detail (e.g. an image region representing a clear sky) using a large filter kernel (e.g. "large" relative to a typical feature size of detail in the image) would be acceptable because the coarse detail may be maintained through the filtering process, and using a large filter kernel may provide better noise reduction compared to using a smaller filter kernel. The image processing (e.g. filtering) could be performed prior to encoding the image, wherein the filtering process may remove detail from areas without much detail to thereby improve the compression of these regions in the encoding process.

In another example, the image processing logic 106 may comprise motion estimation logic configured to apply motion estimation to the rendered image values of the regions of the rendered image in accordance with the cost indications of the corresponding tiles. For example, the image may represent a frame within a video sequence of frames, and the motion to be estimated is motion of content between frames of the video sequence. The cost indications may be useful to improve the efficiency of the motion estimation process. For example, motion estimators based on a pixel difference measure such as Sum of Absolute Differences (SAD) are sensitive to slight misalignments, rotations and filtering of high detail image content. Accordingly, in areas of high detail (as indicated by high cost indications) it may be desirable to relax the matching criteria used in the motion estimation or to put more computational effort into finding a better motion vector (e.g. by using a more expensive but robust motion estimator). As another example, the cost indications could be used as a guide for candidate search locations in a motion estimation process, e.g. if the motion estimator is looking for a high detail region in one frame it may be worth checking the high detail regions in the other frames first (which may lead to a more efficient motion estimation process), or conversely low detail regions (as indicated by low cost indications) may be excluded from the search (which may lead to improved search due to better candidate motions to be considered). Excluding regions from the motion search may be risky because the cost indications might not correctly indicate the level of detail in the regions, but if the cost indications are determined conservatively then if there is doubt then a region is specified as high cost, so the risk of excluding regions which would show correct motion is low.

The image processing logic 106 may comprise more than one type of post-processing logic, such as video encoding logic and/or motion estimation logic and/or filtering logic configured to process the rendered image values in accordance with the cost indications.

There may be constraints placed on the way in which the computing system 100 outputs the rendered and processed image values from the image processing logic 106. For example, if the rendered and processed image values are to be displayed on a display in real-time then there may be a timing constraint at which images, or parts of images, are output from the computing system 100. Furthermore, if the rendered and processed image values are to be transmitted over a network or stored in a memory then there may be a constraint on the amount of data used to represent images, or parts of images, which are output from the computing system 100. For example, the computing system 100 may be configured to cause the image processing logic 106 to process rendered image values for regions of the rendered image in dependence on the cost indications for the corresponding sets of one or more tiles, in order to satisfy at least one constraint. The at least one constraint may comprise one or more of: (i) a constraint on the amount of data used to represent each of the processed regions of the processed image output from the image processing logic 106; (ii) a constraint on the amount of data used to represent the processed image output from the image processing logic 106; (iii) a constraint on the timing at which each of the processed regions of the processed image are output from the image processing logic 106; and (iv) a constraint on the timing at which the processed image is output from the image processing logic 106.

In the examples described above, the cost indications for the sets of one or more tiles are used to improve a process of applying post-processing to the rendered image values. However, in other examples, the cost indications could be used for other purposes. For example, the cost indications for the sets of one or more tiles could be used to schedule the sets of one or more tiles for rendering by the image rendering logic 110. More generally, the cost indications for the sets of one or more tiles could be used to schedule the processing of the sets of one or more tiles on one or more processing cores. The processing performed by the one or more processing cores could be rendering applied by the image rendering logic 110, or could be other processing such as video encoding as in the examples described above. The scheduling may attempt to avoid starting the processing of an expensive tile near the end of a render. In some examples, the scheduling decision for a particular tile does not alter the manner in which that particular tile is subsequently rendered.

In other examples, the cost indications could be used to alter the manner in which different tiles are processed, e.g. the manner in which the tiles are rendered, or to alter the manner in which image regions of the rendered image corresponding to different tiles are processed. For example, a high cost indication may indicate that there is a lot of detail in a tile (e.g. when the cost indications represent the number of primitives in a tile), in which case these tiles could be rendered with a greater level of detail (e.g. more sample positions per pixel could be processed in a rasterisation technique or more rays could be processed per pixel in a ray tracing technique). Alternatively, if there is a real-time constraint on the timing with which tiles are processed then tiles with a lot of detail (as indicated by the cost indications) may be processed with a lower level of detail to ensure that they are processed in time for the real-time constraint to be satisfied. For example, images may be rendered and directly displayed according to a raster scanning technique of the display. In this example, each tile may have a deadline by which it must be rendered in order to be displayed in real time as the raster scan of the display proceeds. If a tile is not rendered before its deadline then it might not be able to be displayed in a current frame, which can cause a stuttering effect in the displayed images. The cost indications provide some indication as to how long a tile will take to process and as such can be used to vary the level of detail of rendering a tile with the aim of ensuring that each tile is rendered before its deadline for is providing the rendered tile to a display.

In some examples, a cost indication for use in scheduling the sets of one or more tiles for rendering by the image rendering logic 110 may be different to the cost indication that is passed to the image processing logic 106 for use as described above. Often the cost indications will be the same or similar for use in the image rendering logic 110 and in the image processing logic 106 but not always. For example, the image detail present in a used texture is a strong indicator of cost for the video encoder (an image region which has been textured with a highly detailed texture is more costly to encode than an image region which has been textured with a less detailed texture) but the image detail present in a texture represents a negligible cost difference for the graphics rendering logic 102 (the complexity of a texture fetch does not strongly depend upon the colour of the returned texture data).

In examples described above the cost indications are determined by the cost indication logic in the geometry processing logic 112. In other examples, the cost indications could be determined at a different point in the pipeline. For example, the cost indications could be determined by cost indication logic included as part of the image rendering logic. This may allow the cost indications to more closely reflect the complexity of the rendered image since the image rendering logic has more accurate knowledge than the geometry processing logic of the complexity of the rendered images. The cost indication for a region of a rendered image could even be determined after that image region has been rendered.

Furthermore, in some examples, the image rendering logic 110 may modify the cost indications determined by the geometry processing logic 108, e.g. based on texture information applied to the regions of the rendered image. In this way, a tile cost estimate could be determined in the geometry processing logic 108 and then later modified after the tile has been processed by the image rendering logic 110. After the tile has been processed there is potentially a lot of information about the actual cost of encoding a block (e.g. the graphics rendering logic 102 may have a better estimate of how many polygons were in each tile, e.g. how is many of the primitives in a tile were eventually visible (i.e. not hidden), and/or in a setup where some post-processing such as frame buffer compression is present the compression itself could provide a good guide of how much detail is in a region of the rendered image). Therefore, parts of the pipeline after the geometry processing logic 108 can be used to modify or overrule the cost indications determined in the geometry processing logic 108 before the cost indications are provided to the image processing logic 106. For example, the image rendering logic 110 may be able to determine that a single primitive in a tile ended up occluding all of the other primitives in the tile when the tile is rendered, and in this case it may be beneficial to use a cost indication that reflects that only one primitive is visible in the tile rather than using a cost indication determined by the geometry processing logic 108 which may indicate that there are many primitives in the tile (since the geometry processing logic 108 might not know that all but one of the primitives in the tile are hidden).

A benefit of determining the cost indications in the geometry processing logic 108 is that this is simple to implement (e.g. by counting the number of primitive identifiers included in a control stream for a tile), and that this might not add significant latency into the system, e.g. in the case that rendered images are to be processed by the image processing logic 106 in real-time (e.g. for transmission to a display so that the rendered images can be displayed to a user in real-time).

Furthermore, it is noted that the cost indications provided to the image processing logic 106 might be one of a number of pieces of information in accordance with which the operation of the image processing logic 106 is controlled.

In general, a graphics processing unit which is configured to process graphics data using a rendering space which is sub-divided into a plurality of tiles may include one or more processing cores configured to process graphics data; cost indication logic configured to obtain a cost indication for each of a plurality of sets of one or more tiles of the rendering space, wherein the cost indication for a set of one or more tiles is suggestive of a cost of processing the set of one or more tiles; and scheduling logic configured to schedule, in dependence upon the cost indications, the sets of one or more tiles for processing on the one or more processing cores.

Figure 4:
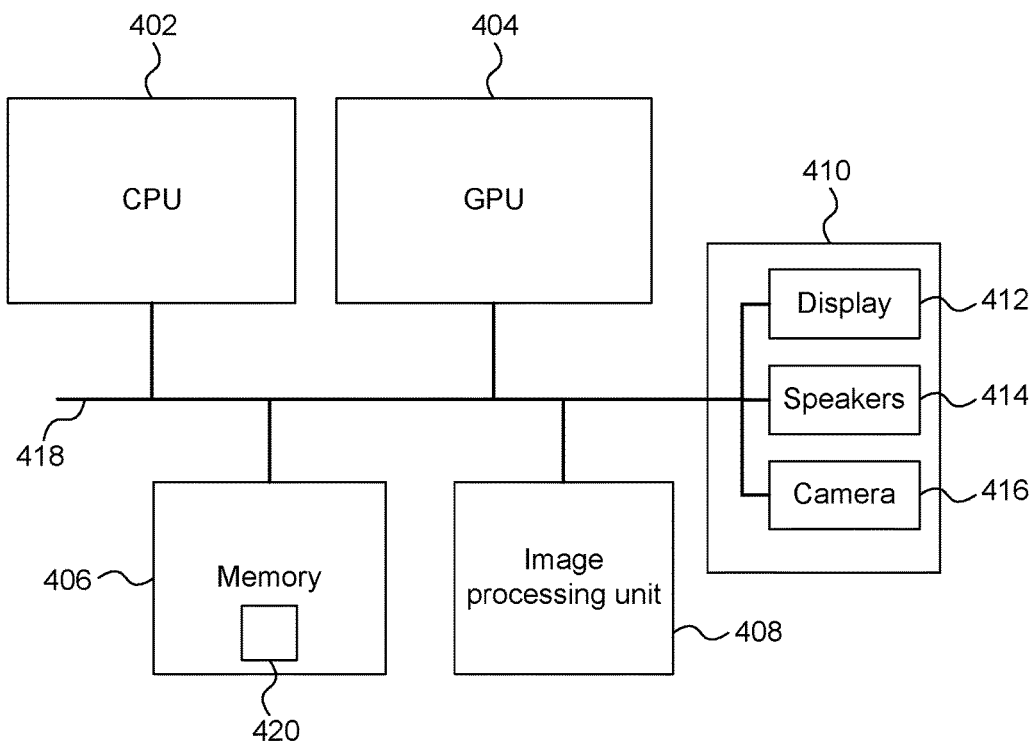
FIG. 4 shows a broader context of the computing system.

FIG. 4 shows a wider computer system in which the computing systems described herein may be implemented. The computer system comprises a CPU 402, a GPU 404 (which may comprise the graphics rendering logic 102), a memory 406, an image processing unit 408 (which may comprise the image processing logic 106) and other devices 410, such as a display 412, speakers 414 and a camera 416. The components of the computer system can communicate with each other via a communications bus 418. A store 420 (corresponding to memory 104) is implemented as part of the memory 406.

The computing system of FIG. 1 is shown as comprising a number of functional blocks. This is schematic only and is not intended to define a strict division between different logic elements of such entities. Each functional block may be provided in any suitable manner. It is to be understood that intermediate values described herein as being formed by a computing system need not be physically generated by the computing system at any point and may merely represent logical values which conveniently describe the processing performed by the computing system between its input and output.

The computing systems described herein may be embodied in hardware on an integrated circuit. The computing systems described herein may be configured to perform any of the methods described herein. Generally, any of the functions, methods, techniques or components described above can be implemented in software, firmware, hardware (e.g., fixed logic circuitry), or any combination thereof. The terms "module," "functionality," "component", "element", "unit", "block" and "logic" may be used herein to generally represent software, firmware, hardware, or any combination thereof. In the case of a software implementation, the module, functionality, component, element, unit, block or logic represents program code that performs the specified tasks when executed on a processor. The algorithms and methods described herein could be performed by one or more processors executing code that causes the processor(s) to perform the algorithms/methods. Examples of a computer-readable storage medium include a random-access memory (RAM), read-only memory (ROM), an optical disc, flash memory, hard disk memory, and other memory devices that may use magnetic, optical, and other techniques to store instructions or other data and that can be accessed by a machine.

The terms computer program code and computer readable instructions as used herein refer to any kind of executable code for processors, including code expressed in a machine language, an interpreted language or a scripting language. Executable code includes binary code, machine code, bytecode, code defining an integrated circuit (such as a hardware description language or netlist), and code expressed in a programming language code such as C, Java or OpenCL. Executable code may be, for example, any kind of software, firmware, script, module or library which, when suitably executed, processed, interpreted, compiled, executed at a virtual machine or other software environment, cause a processor of the computer system at which the executable code is supported to perform the tasks specified by the code.

A processor, computer, or computer system may be any kind of device, machine or dedicated circuit, or collection or portion thereof, with processing capability such that it can execute instructions. A processor may be any kind of general purpose or dedicated processor, such as a CPU, GPU, System-on-chip, state machine, media processor, an application-specific integrated circuit (ASIC), a programmable logic array, a field-programmable gate array (FPGA), or the like. A computer or computer system may comprise one or more processors.

It is also intended to encompass software which defines a configuration of hardware as described herein, such as HDL (hardware description language) software, as is used for designing integrated circuits, or for configuring programmable chips, to carry out desired functions. That is, there may be provided a computer readable storage medium having encoded thereon computer readable program code in the form of an integrated circuit definition dataset that when processed in an integrated circuit manufacturing system configures the system to manufacture a computing system configured to perform any of the methods described herein, or to manufacture a computing system comprising any apparatus described herein. An integrated circuit definition dataset may be, for example, an integrated circuit description.

Therefore, there may be provided a method of manufacturing, at an integrated circuit manufacturing system, a computing system as described herein. Furthermore, there may be provided an integrated circuit definition dataset that, when processed in an integrated circuit manufacturing system, causes the method of manufacturing a computing system to be performed.

An integrated circuit definition dataset may be in the form of computer code, for example as a netlist, code for configuring a programmable chip, as a hardware description language defining an integrated circuit at any level, including as register transfer level (RTL) code, as high-level circuit representations such as Verilog or VHDL, and as low-level circuit representations such as OASIS® and GDSII. Higher level representations which logically define an integrated circuit (such as RTL) may be processed at a computer system configured for generating a manufacturing definition of an integrated circuit in the context of a software environment comprising definitions of circuit elements and rules for combining those elements in order to generate the manufacturing definition of an integrated circuit so defined by the representation. As is typically the case with software executing at a computer system so as to define a machine, one or more intermediate user steps (e.g. providing commands, variables etc.) may be required in order for a computer system configured for generating a manufacturing definition of an integrated circuit to execute code defining an integrated circuit so as to generate the manufacturing definition of that integrated circuit.

An example of processing an integrated circuit definition dataset at an integrated circuit manufacturing system so as to configure the system to manufacture a computing system will now be described with respect to FIG. 5.

Figure 5:
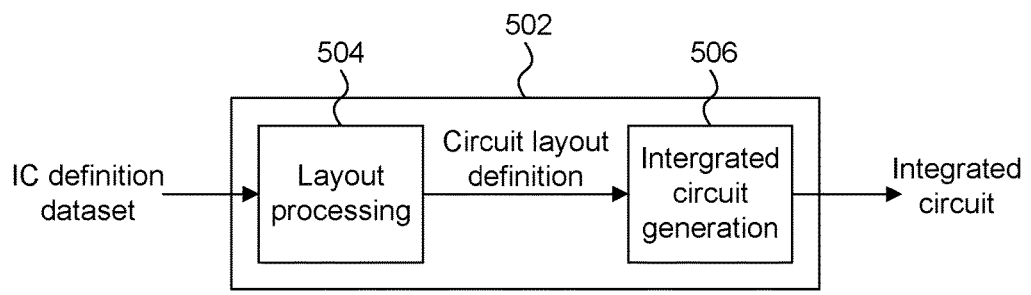
FIG. 5 shows an integrated circuit manufacturing system for generating an integrated circuit embodying a computing system.

FIG. 5 shows an example of an integrated circuit (IC) manufacturing system 502 which comprises a layout processing system 504 and an integrated circuit generation system 506. The IC manufacturing system 502 is configured to receive an IC definition dataset (e.g. defining a computing system as described in any of the examples herein), process the IC definition dataset, and generate an IC according to the IC definition dataset (e.g. which embodies a computing system as described in any of the examples herein). The processing of the IC definition dataset configures the IC manufacturing system 502 to manufacture an integrated circuit embodying a computing system as described in any of the examples herein.

The layout processing system 504 is configured to receive and process the IC definition dataset to determine a circuit layout. Methods of determining a circuit layout from an IC definition dataset are known in the art, and for example may involve synthesising RTL code to determine a gate level representation of a circuit to be generated, e.g. in terms of logical components (e.g. NAND, NOR, AND, OR, MUX and FLIP-FLOP components). A circuit layout can be determined from the gate level representation of the circuit by determining positional information for the logical components. This may be done automatically or with user involvement in order to optimise the circuit layout. When the layout processing system 504 has determined the circuit layout it may output a circuit layout definition to the IC generation system 506. A circuit layout definition may be, for example, a circuit layout description.

The IC generation system 506 generates an IC according to the circuit layout definition, as is known in the art. For example, the IC generation system 506 may implement a semiconductor device fabrication process to generate the IC, which may involve a multiple-step sequence of photo lithographic and chemical processing steps during which electronic circuits are gradually created on a wafer made of semiconducting material. The circuit layout definition may be in the form of a mask which can be used in a lithographic process for generating an IC according to the circuit definition. Alternatively, the circuit layout definition provided to the IC generation system 506 may be in the form of computer-readable code which the IC generation system 506 can use to form a suitable mask for use in generating an IC.

The different processes performed by the IC manufacturing system 502 may be implemented all in one location, e.g. by one party. Alternatively, the IC manufacturing system 502 may be a distributed system such that some of the processes may be performed at different locations, and may be performed by different parties. For example, some of the stages of: (i) synthesising RTL code representing the IC definition dataset to form a gate level representation of a circuit to be generated, (ii) generating a circuit layout based on the gate level representation, (iii) forming a mask in accordance with the circuit layout, and (iv) fabricating an integrated circuit using the mask, may be performed in different locations and/or by different parties.

In other examples, processing of the integrated circuit definition dataset at an integrated circuit manufacturing system may configure the system to manufacture a computing system without the IC definition dataset being processed so as to determine a circuit layout. For instance, an integrated circuit definition dataset may define the configuration of a reconfigurable processor, such as an FPGA, and the processing of that dataset may configure an IC manufacturing system to generate a reconfigurable processor having that defined configuration (e.g. by loading configuration data to the FPGA).

In some embodiments, an integrated circuit manufacturing definition dataset, when processed in an integrated circuit manufacturing system, may cause an integrated circuit manufacturing system to generate a device as described herein. For example, the configuration of an integrated circuit manufacturing system in the manner described above with respect to FIG. 5 by an integrated circuit manufacturing definition dataset may cause a device as described herein to be manufactured.

In some examples, an integrated circuit definition dataset could include software which runs on hardware defined at the dataset or in combination with hardware defined at the dataset. In the example shown in FIG. 5, the IC generation system may further be configured by an integrated circuit definition dataset to, on manufacturing an integrated circuit, load firmware onto that integrated circuit in accordance with program code defined at the integrated circuit definition dataset or otherwise provide program code with the integrated circuit for use with the integrated circuit.

The implementation of concepts set forth in this application in devices, apparatus, modules, and/or systems (as well as in methods implemented herein) may give rise to performance improvements when compared with known implementations. The performance improvements may include one or more of increased computational performance, reduced latency, increased throughput, and/or reduced power consumption. During manufacture of such devices, apparatus, modules, and systems (e.g. in integrated circuits) performance improvements can be traded-off against the physical implementation, thereby improving the method of manufacture. For example, a performance improvement may be traded against layout area, thereby matching the performance of a known implementation but using less silicon. This may be done, for example, by reusing functional blocks in a serialised fashion or sharing functional blocks between elements of the devices, apparatus, modules and/or systems. Conversely, concepts set forth in this application that give rise to improvements in the physical implementation of the devices, apparatus, modules, and systems (such as reduced silicon area) may be traded for improved performance. This may be done, for example, by manufacturing multiple instances of a module within a predefined area budget.

The applicant hereby discloses in isolation each individual feature described herein and any combination of two or more such features, to the extent that such features or combinations are capable of being carried out based on the present specification as a whole in the light of the common general knowledge of a person skilled in the art, irrespective of whether such features or combinations of features solve any problems disclosed herein. In view of the foregoing description it will be evident to a person skilled in the art that various modifications may be made within the scope of the invention.

What is claimed is:

1. A computing system comprising:
graphics rendering logic configured to process graphics data to render an image using a rendering space which is sub-divided into a plurality of tiles, the graphics rendering logic comprising cost indication logic configured to obtain a cost indication for each of a plurality of sets of one or more tiles of the rendering space, wherein the cost indication for a set of one or more tiles is suggestive of a cost associated with processing rendered image values for a region of the rendered image corresponding to the set of one or more tiles; and
image processing logic configured to process rendered image values for regions of the rendered image;
wherein the computing system is configured to cause the image processing logic to process rendered image values for regions of the rendered image in dependence on the cost indications for the corresponding sets of one or more tiles.

2. The computing system of claim 1 wherein the computing system is configured to cause the image processing logic to process rendered image values for regions of the rendered image in dependence on the cost indications for the corresponding sets of one or more tiles by controlling one or both of:
an order in which regions of the rendered image are processed by the image processing logic, and
a level of quality with which regions of the rendered image are processed by the image processing logic.

3. The computing system of claim 2 wherein the system is configured to control the order in which regions of the rendered image are processed by the image processing logic such that a region of the rendered image corresponding to a set of one or more tiles which has a relatively high cost indication is processed by the image processing logic before a region of the rendered image corresponding to a set of one or more tiles which has a relatively low cost indication.

4. The computing system of claim 1 wherein the image processing logic is configured to:
receive the rendered image values for regions of the rendered image and the cost indications for the corresponding sets of one or more tiles; and
control the processing of the rendered image values for regions of the rendered image in dependence on the cost indications for the corresponding sets of one or more tiles.

5. The computing system of claim 4 wherein the image processing logic is configured to control the processing of the rendered image values for regions of the rendered image further in dependence on an indication of the total cost associated with processing all of the regions of the rendered image.

6. The computing system of claim 1 wherein the graphics rendering logic is configured to:
determine an order in which regions of the rendered image are to be processed by the image processing logic in dependence on the cost indications for the corresponding sets of one or more tiles; and
cause the regions of the rendered image to be provided to the image processing logic in the determined order.

7. The computing system of claim 1 further comprising a transmission unit configured to transmit, over a network, processed image values for the image processed by the image processing logic.

8. The computing system of claim 1 further comprising a memory configured to store processed image values for the image processed by the image processing logic.

9. The computing system of claim 1 wherein the image processing logic comprises video encoding logic configured to encode the rendered image values for regions of the rendered image in dependence on the cost indications for the corresponding sets of one or more tiles.

10. The computing system of claim 9 wherein the video encoding logic is configured to encode blocks of rendered image values of the rendered image.

11. The computing system of claim 10 wherein the blocks of the rendered image values match the regions of the rendered image.

12. The computing system of claim 10 wherein the blocks of the rendered image values do not match the regions of the rendered image, wherein each block of the rendered image values overlaps with one or more of the regions of the rendered image, and wherein the blocks of the rendered image values are encoded by the video encoding logic based on the one or more cost indications associated with said one or more overlapping regions of the rendered image.

13. The computing system of claim 9 wherein the video encoding logic is configured to:
allocate budgets of data for the encoded regions of the rendered image in accordance with the cost indications for the corresponding sets of one or more tiles; and
encode the regions of the rendered image in accordance with the respective allocated budgets of data.

14. The computing system of claim 13 wherein the video encoding logic is configured to allocate budgets of data for the encoded regions of the rendered image by dividing a total data budget for the encoded image amongst the regions of the rendered image in accordance with the cost indications for the corresponding sets of one or more tiles.

15. The computing system of claim 9 wherein the video encoding logic is configured to:
set quantisation parameters for encoding the regions of the rendered image in accordance with the cost indications for the corresponding sets of one or more tiles; and
encode the regions of the rendered image in accordance with the respective quantisation parameters.

16. The computing system of claim 1 wherein the image processing logic comprises one or more of:
image filtering logic configured to apply filtering to the rendered image values for regions of the rendered image in dependence on the cost indications for the corresponding sets of one or more tiles; and
motion estimation logic configured to apply motion estimation to regions of the rendered image in dependence on the cost indications for the corresponding sets of one or more tiles, wherein the image represents a frame of a sequence of frames.

17. The computing system of claim 1 wherein the computing system is configured to cause the image processing logic to process rendered image values for regions of the rendered image in dependence on the cost indications for the corresponding sets of one or more tiles, in order to satisfy at least one of:
a constraint on the amount of data used to represent each of the processed regions of the processed image output from the image processing logic;
a constraint on the amount of data used to represent the processed image output from the image processing logic;

a constraint on the timing at which each of the processed regions of the processed image are output from the image processing logic; and a constraint on the timing at which the processed image is output from the image processing logic.

18. The computing system of claim 1 wherein the cost indication logic is configured to determine a cost indication for a tile of the rendering space based on one or more of the following factors:
   (i) a number of primitives in the tile;
   (ii) object types associated with the primitives in the tile;
   (iii) tile coverage area of the primitives in the tile;
   (iv) textures to be applied to primitives in the tile during the rendering of an image region corresponding to the tile;
   (v) a user input; and
   (vi) a cost associated with processing a corresponding image region in a previous frame, wherein the image represents a frame of a sequence of frames.

19. A computer-implemented method of processing graphics data, the method comprising:
   processing graphics data to render an image using a rendering space which is sub-divided into a plurality of tiles, said processing of the graphics data comprising obtaining a cost indication for each of a plurality of sets of one or more tiles of the rendering space, wherein the cost indication for a set of one or more tiles is suggestive of a cost associated with processing rendered image values for a region of the rendered image corresponding to the set of one or more tiles; and processing rendered image values for regions of the rendered image in dependence on the cost indications for the corresponding sets of one or more tiles, thereby determining a processed image.

20. A non-transitory computer readable storage medium having stored thereon a computer readable description of an integrated circuit that, when processed in an integrated circuit manufacturing system, causes the integrated circuit manufacturing system to manufacture a computing system which comprises:
   graphics rendering logic configured to process graphics data to render an image using a rendering space which is sub-divided into a plurality of tiles, the graphics rendering logic comprising cost indication logic configured to obtain a cost indication for each of a plurality of sets of one or more tiles of the rendering space, wherein the cost indication for a set of one or more tiles is suggestive of a cost associated with processing rendered image values for a region of the rendered image corresponding to the set of one or more tiles; and
   image processing logic configured to process rendered image values for regions of the rendered image;
   wherein the computing system is configured to cause the image processing logic to process rendered image values for regions of the rendered image in dependence on the cost indications for the corresponding sets of one or more tiles.

* * * * *